Nov. 11, 1958

G. H. TOWNER 2,860,306

PHASE-AMPLITUDE DETECTOR

Filed April 2, 1954

INVENTOR.:
George H. Towner

By Herbert E. Metcalf
His Patent Attorney

# United States Patent Office 2,860,306
Patented Nov. 11, 1958

2,860,306

PHASE-AMPLITUDE DETECTOR

George H. Towner, San Diego, Calif., assignor to Northrop Aircraft, Inc., Hawthorne, Calif., a corporation of California Application April 2, 1954, Serial No. 420,537

4 Claims. (Cl. 324—89)

This invention relates to means for the detection of signals of desired phase and for the elimination of spurious signals therefrom and, more particularly, to a phase-amplitude detector system utilizing inverse feedback.

Phase detection and the accompanying elimination of undesirable quadrature signals is of especial importance in servomechanism operation where an idealized output signal enhances accurate operation. It is not uncommon during prolonged operation for tubes to change characteristics slightly and for the magnitude of circuit components to vary within a certain tolerance. Owing to such circumstances, it is not surprising that the fiducial voltage representing zero level or null point in a servo system might vary somewhat. Such an effect is highly undesirable.

It is, accordingly, an object of this invention to provide means for establishing a relatively stable zero reference level in a servo system.

It is a further object of this invention to provide means for the elimination of quadrature voltage in a servo output signal.

It is another object of this invention to provide servo signals capable of effecting movements of high precision.

Briefly, the invention comprises an amplifier, the output of which is coupled to a pair of phase detecting triodes via an input transformer, the grids of the phase detecting triodes being controlled by a reference voltage applied through a double secondary transformer whereby one triode is connected to conduct when the other is effectively cut off. Conduction of the respective triodes corresponds to a respective reference voltage phase of 0° and of 180°. Another tube is connected in reverse polarity to the phase detecting triodes and conducts when the input signal is negative, consequently balancing the circuit when neither triode is conducting. A voltage which is developed whenever the triodes conduct is fed back to the amplifier input thereby shaping the output voltage in accordance with the input voltage. Thus, the reference voltage provides gating signals of a desired phase and a D. C. output signal is passed in proportion to the in phase component and magnitude of the input voltage.

The foregoing description and other objects of the invention will become more apparent upon reading the following detailed description in conjunction with the accompanying drawings, in which.

Figure 1:
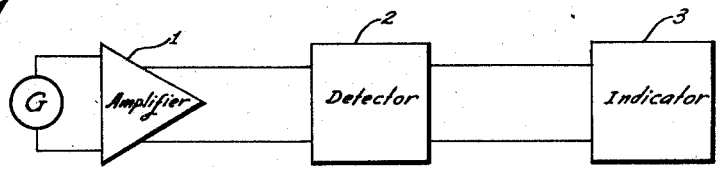
Figure 1 is a block diagram of the invention as used in conjunction with an indicating device.

Referring now to Figure 1, a generalized block diagram of the invention, there is shown a signal generator G providing a 400 cycle signal, for example, having components from 0° to 360°, which is conveyed to amplifier 1. Of the many components comprising this signal only the 0° and the 180° components are desired inasmuch as the other components do not usually contain desirable information. The output of amplifier 1 is connected to phase amplitude detector 2 which is used to separate the useful signal from spurious signals and is, simultaneously, linearly responsive to the amplitude of this idealized signal producing a proportionate D. C. output. The output therefrom is utilized to drive indicator 3—a voltmeter, for example. Use of amplifier 1 is, of course, optional and is dependent upon prevailing circuit conditions.

Figure 2:
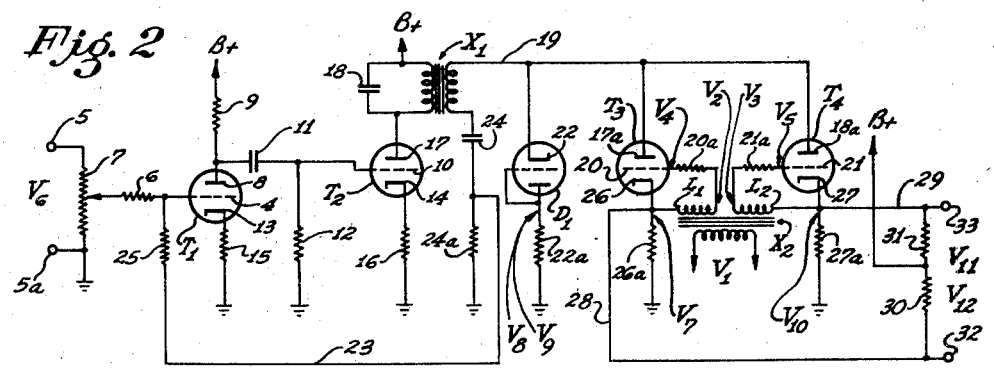
Figure 2 is a schematic circuit diagram of the invention.

In Figure 2, a detailed schematic diagram of the phase amplitude detector 2 is presented. The amplifier section includes two stages, i. e., triodes $T_1$ and $T_2$. The grid 4 of $T_1$ is connected to a 400 C. P. S. signal input terminal 5 via grid resistor 6 and potentiometer 7. Input terminal 5a is grounded. Plate 8 is connected to a suitable B+ voltage (250 volts, for example) through plate resistor 9 and also to grid 10 of triode $T_2$ by coupling condenser 11 and grid return resistor 12. Cathodes 13 and 14 of triodes $T_1$ and $T_2$, respectively, are connected to ground via cathode resistors 15 and 16, respectively. Plate 17 of triode $T_2$ is connected to B+ through the primary of a transformer $X_1$ and a bypass condenser 18 is connected across this primary. Lead 19 on the secondary of transformer $X_1$ is connected to plates 17a and 18a of triodes $T_3$ and $T_4$, respectively, and to cathode 22 of triode $D_1$ which is connected as a diode by tying the grid to plate. The plate of $D_1$ is connected to ground through resistor 22a. The other side of the secondary of transformer $X_1$ is connected to a balancing condenser 24 in series with resistor 24a. The voltage across resistor 24a is fed back by lead 23 through resistor 25 to the input grid 4 of triode $T_1$. Grids 20 and 21 are respectively connected through limiting resistors 20a and 21a to secondaries $L_1$ and $L_2$ of a double secondary transformer $X_2$ and through to cathodes 26 and 27. Cathodes 26 and 27 are connected to output terminals 32 and 33, respectively, and to ground through resistors 26a and 27a. Resistors 30 and 31 are connected in series between terminals 32 and 33, and the common junction between resistors 30 and 31 is connected to B+ as shown.

Figure 3:
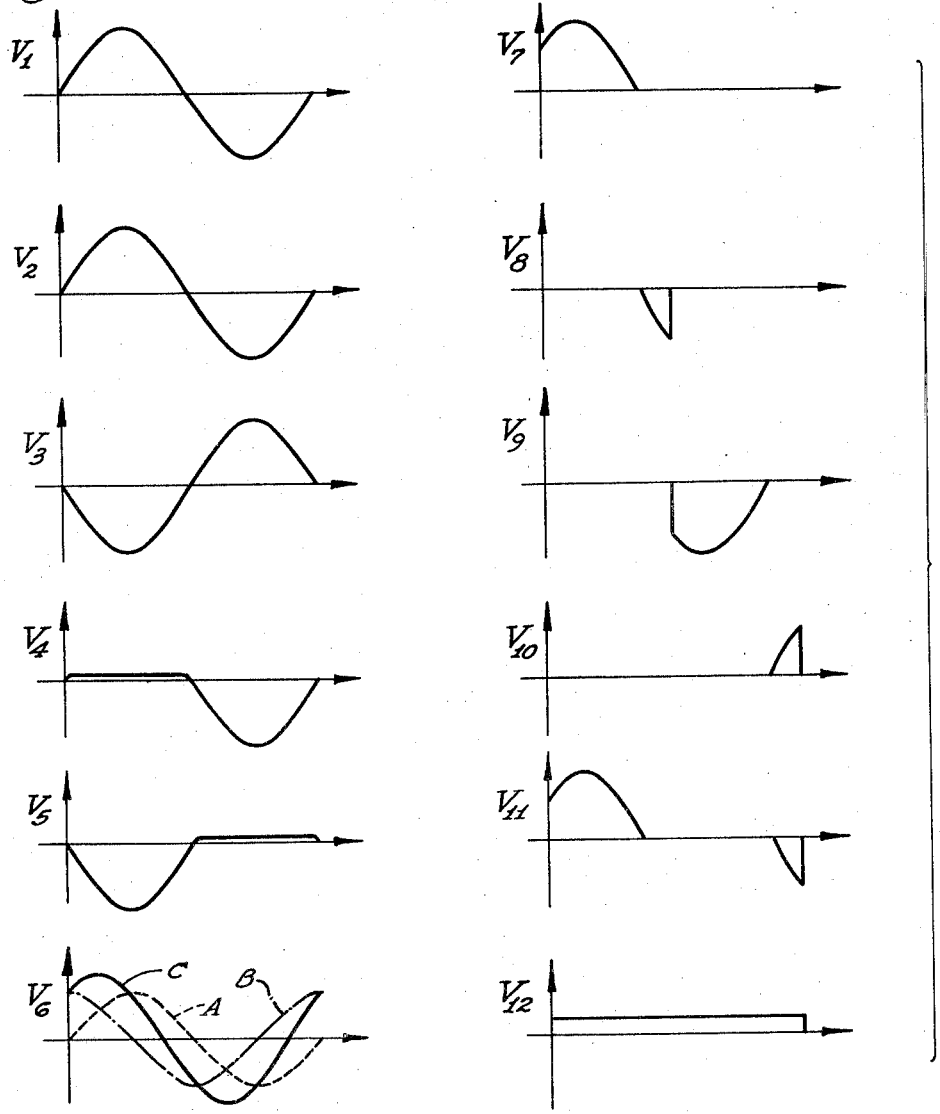
Figure 3 is a drawing of several graphs which illustrate operation of the circuit of Figure 2.

In order to explain operation of the circuit shown in Figure 2, reference will be made to the voltage waveforms shown in Figure 3, which are identified by a literal notation V with an appropriate subscript as shown in various parts of the circuit of Figure 2. Consider first an essentially sinusoidal input signal $V_6$ whose phase as compared to reference signal $V_1$ is indicated in Figure 3. This signal $V_6$ is amplified by triode $T_1$ and is then conveyed to grid 10 of triode $T_2$ and the resulting amplified plate output therefrom is conveyed to plates 17a and 18a of phase detecting triodes $T_3$ and $T_4$, respectively, via coupling transformer $X_1$ and lead 19. Grids 20 and 21 of triodes $T_3$ and $T_4$, respectively, are controlled by transformer $X_2$, the reference voltage $V_1$ inducing secondary voltages $V_2$ and $V_3$ causes one tube ($T_3$ or $T_4$) to conduct while the other tube is cut off. Thus conduction of a half cycle duration alternates between tubes $T_3$ and $T_4$ as the phase of the reference voltage $V_1$ applied at transformer $X_2$ varies from 0° to 360°. However, during a negative portion of the input signal, neither tube $T_3$ nor $T_4$ can conduct owing to their plates 17a and 18a, respectively, being connected to coupling transformer $X_1$ as shown, but tube $D_1$, because of connection of cathode 22 to transformer $X_1$ does conduct, thereby providing circuit balance during interim negative portions of the input signal.

The relative phase of reference waveform $V_1$ is shown in Figure 3. The effect of reference voltage $V_1$ is to initiate conduction alternately of tube $T_3$ and of tube $T_4$; it is to be noted, however, that these two tubes never conduct simultaneously in the circuit. Waveform $V_2$ is induced across $L_1$ and the mirror image thereof, $V_3$, is induced across $L_2$. Waveform $V_4$ appears at grid 20 (to cathode 26) of tube $T_3$ and the horizontally reversed image thereof (waveform $V_5$) appears at grid 21 (to cathode 27) of tube $T_4$, owing to reverse polarity connections in the secondary coils $L_1$ and $L_2$ of transformer $X_2$ (180° phase shift therein).

An amplified reproduction of waveform $V_6$ appears across the secondary of transformer $X_1$. It is to be noted that this amplified waveform of $V_6$ can be resolved into in-phase and quadrature components which one may designate as vectors $\overline{A}$ and $\overline{B}$; these two components appear in their proper relation to amplified waveform $V_6$, which may be represented by vector $\overline{C}$, in Figure 3; then $\overline{A}+\overline{B}=\overline{C}$ or $A\angle 0+B\angle 90=C\angle \theta$. The angle $\theta$ is 45° only when magnitude A is equal to magnitude B. During the first half cycle of the reference voltage $V_1$, the grid of $T_3$ is positive (due to $V_2$) and the tube is conducting in accordance with the input signal $V_6$ (amplified) appearing on the plate 17a. Consequently, voltage waveform $V_7$ appears across resistor 26a. Triode $T_4$ does not conduct because the grid is negative due to $V_3$. When $V_6$ becomes negative, $T_3$ ceases to conduct but $D_1$ begins and waveform $V_8$ appears across resistor 22a. Similarly, for the second half cycle of the reference voltage $V_1$, $V_9$ appears across resistor 22a when neither $T_3$ or $T_4$ can conduct. However, when $V_6$ again becomes positive during the second half cycle of reference waveform $V_1$, a positive voltage $V_{10}$ appears across resistor 27a. The voltages across resistors 26a and 27a are presented between output terminals 32 and 33, hence this output voltage is shown as $V_{11}$ which is the algebraic difference of $V_7$ and $V_{10}$. The average of these two signals is equivalent to a D. C. output signal $V_{12}$. The resulting direct current output is positive or negative depending on whether $V_7$ or $V_{10}$ is proportionately greater, respectively.

Tube $D_1$, which serves essentially as a diode switch, conducts during the negative portion of signal $V_6$ because of negative voltage waveforms $V_8$ and $V_9$. $D_1$ is shown as a diode-connected triode in order to provide more evenly matched circuit components. Of course, a plain diode would suffice.

It is to be noted that a feedback line 23 is provided to convey a composite voltage of the same shape as waveform $V_7$, $V_8$, $V_9$ and $V_{10}$ to grid 4 of triode $T_1$. This feedback voltage across resistance 24a is approximately the same waveform as $V_6$, but of opposite phase and hence can be used for deriving a feedback voltage to correct for all tube drifts and non-linearity. The thermionic electron flow from cathodes 26 and 27 of electron tubes $T_3$ and $T_4$, respectively, is blocked and minimized by a positive voltage on leads 28 and 29 applied through resistors 30 and 31, respectively.

Essentially, the reference voltage $V_1$ applied via the secondaries of transformer $X_2$ serves as a gating signal which permits a direct current output in proportion to the amplitude of the in-phase component of signal present and divides the quadrature component into parts such that its value averages out to zero. Thus a D. C. voltage output signal is provided between terminals 32 and 33 whose amplitude is determined by subtracting amplitudes of waveforms $V_7$ and $V_{10}$ and the polarity thereof varies in accordance with the phase of the alternating current input signal $V_6$.

The output voltage $V_{11}$ is actually a pulsating signal. This output signal should be filtered before it can be used to drive a D. C. recording device such as a Brown type recorder, for example. A choke and series resistance can be inserted following each resistance 26a and 27a (Figure 2) connecting these resistances (26a and 27a) respectively to ground. A bypass capacitance is provided shunting the inserted choke and series resistance of each branch. Output terminals are secured from connection to the junction between choke and grounding resistance (added elements) of each branch and a filtered D. C. signal is derived between these two output terminals to drive the recorder. The other output terminals 32 and 33 can be left unconnected or a voltmeter can be connected between them.

Figure 4:
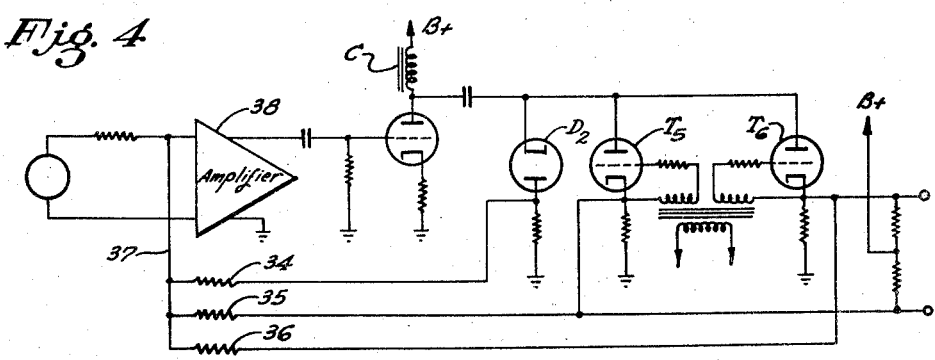
Figure 4 is a schematic circuit diagram of a modified version of the invention.

Figure 4 comprises a schematic diagram of an alternate embodiment of this invention in which choke coupling is utilized instead of transformer coupling and in which an adder arrangement is used to conduct component signals to a feedback path. An advantage of this embodiment of the invention over the one previously discussed is that one can attain more feedback without oscillation owing to the fact that a choke does not include an undesirable feature of a transformer, i. e., leakage reactance which is in series with the amplified signal affecting the phase thereof to a large extent at the higher frequencies.

As reference to Figure 4 will reveal, this embodiment differs from that shown in Figure 2 inasmuch as choke C is used as a signal coupling device instead of transformer $X_1$. Operation of the circuit is the same as explained with reference to Figure 2 except that the signal path to feedback lead 37 is provided via an adder circuit comprising resistors 33, 34, and 35; this adder circuit conveys outputs, e. g., $V_8$ and $V_9$ from diode $D_2$, $V_7$ from triode $T_5$ and $V_{10}$ from triode $T_6$, respectively, to feedback lead 37, thus providing a corrective feedback signal to the grid of amplifier 38. It is noted that only one feedback path is conducting at any one time.

Figure 5:
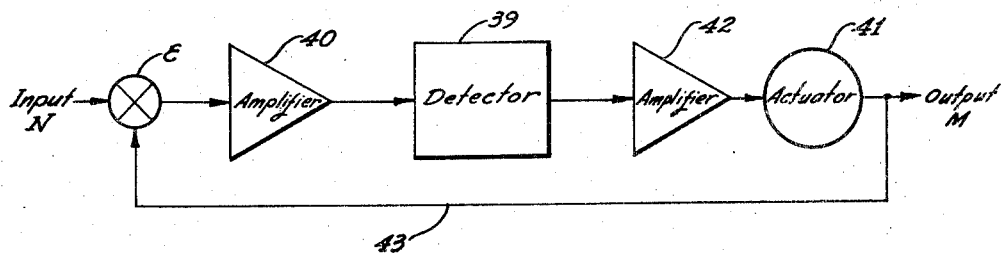
Figure 5 is a block diagram which illustrates a typical application of the invention in a servo system.

The block diagram comprising Figure 5 shows how this invention can be utilized in an error-correcting servo loop application. An input signal N to error detector E is sensed and passed to an embodiment 39 of this invention via an amplifier 40, if necessary. The resulting idealized output from phase-amplitude detector 39 is conveyed to actuator 41 via amplifier 42, if necessary, and the output of actuator 41 is fed back on line 43 to error detector E. This fed back signal is combined with the input signal N for a resultant error input signal to amplifier 40 which operates actuator 41. An output M can be taken from actuator 41, if desired.

Thus illustrative embodiments of the invention have been shown and described; it is to be understood, however, that the invention is not limited to the specific features shown, but that the means and construction herein disclosed comprise the preferred form of several modes of putting the invention into effect and the invention is therefore claimed in any of its forms or modifications within the legitimate and valid scope of the appended claims.

What is claimed is:

1. A phase-amplitude detector, comprising: an amplifier having an input and an output; an inductive coupling means connected to the output of said amplifier, said coupling means having first and second output terminals; a rectifier having a cathode and an anode, the cathode of said rectifier being connected to said first output terminal; resistive means connecting the anode of said rectifier to ground, said second output terminal also adapted to be connected to ground; a first electron tube and a second electron tube each having a plate, grid and cathode, the plates being connected to said first output terminal; a transformer having a primary winding and at least two secondary windings; a reference A. C. voltage of the same frequency as an input signal to said amplifier being applied to the primary winding of said transformer, means connecting said grid and cathode of said first electron tube across one secondary winding and means connecting said grid and cathode of said second electron tube for an opposite phase voltage across another secondary winding of said transformer; resistive means connecting respective cathodes of each of said electron tubes to ground; separate plural D. C. feedback means connecting cathode outputs of said first and of said second electron tubes and plate output of said rectifier to said amplifier input; and output leads connected to said respective cathodes of said first and of said second electron tubes.

2. Apparatus in accordance with claim 1 in which said cathode outputs of said first and of said second electron tubes and the plate output of said rectifier is connected to said amplifier input through feedback means comprising three parallel resistors respectively connecting with said cathode and plate outputs.

3. Apparatus in accordance with claim 1 in which said coupling device is a choke.

4. Apparatus in accordance with claim 1 including means for biasing the cathodes of said first and second electron tubes at a positive potential whereby thermionic electron flow is minimized.

References Cited in the file of this patent

UNITED STATES PATENTS

| | | |
|---|---|---|
| 2,434,823 | Van Beuren | Jan. 20, 1948 |
| 2,527,096 | Howes | Oct. 24, 1950 |
| 2,569,232 | De Liban | Sept. 25, 1951 |
| 2,582,596 | MacRae | Jan. 15, 1952 |
| 2,589,721 | McNaney | Mar. 18, 1952 |

OTHER REFERENCES

"Radio Engineering," Terman, 3rd Ed., 1947, pp. 322–324.